United States Patent
Schmugar et al.

(10) Patent No.: US 10,303,876 B2
(45) Date of Patent: May 28, 2019

(54) PERSISTENCE PROBING TO DETECT MALWARE

(71) Applicant: McAfee, Inc., Santa Clara, CA (US)

(72) Inventors: Craig Schmugar, Hillsboro, OR (US);
John Teddy, Beaverton, OR (US);
Cedric Cochin, Portland, OR (US)

(73) Assignee: McAfee, LLC, Santa Clara, CA (US)

( * ) Notice: Subject to any disclaimer, the term of this patent is extended or adjusted under 35 U.S.C. 154(b) by 151 days.

(21) Appl. No.: 15/391,387

(22) Filed: Dec. 27, 2016

(65) Prior Publication Data

US 2018/0181753 A1    Jun. 28, 2018

(51) Int. Cl.
*G06F 21/00* (2013.01)
*G06F 21/56* (2013.01)
*G06F 21/57* (2013.01)

(52) U.S. Cl.
CPC .......... *G06F 21/566* (2013.01); *G06F 21/568* (2013.01); *G06F 21/575* (2013.01); *G06F 2221/034* (2013.01)

(58) Field of Classification Search
CPC ...... G06F 21/566; G06F 21/56; G06F 21/568; G06F 2221/034; G06F 21/565; G06F 21/575; H04L 63/1425; H04L 63/1433

USPC .......................................................... 726/23
See application file for complete search history.

(56) References Cited

U.S. PATENT DOCUMENTS

| 9,330,260 B1* | 5/2016 | Guo ....................... G06F 21/566 |
| 2011/0225655 A1 | 9/2011 | Niemela et al. |
| 2016/0182550 A1* | 6/2016 | Spurlock ............. H04L 63/1425 |
| | | 726/23 |

OTHER PUBLICATIONS

International Searching Authority, "International Search Report and Written Opinion," issued in connection with PCT patent application No. PCT/US2017/068444, dated Mar. 20, 2018, 16 pages.

* cited by examiner

*Primary Examiner* — Yogesh Paliwal
(74) *Attorney, Agent, or Firm* — Hanley, Flight and Zimmerman, LLC

(57) ABSTRACT

A technique for detecting malware looks at startup hooks that may be created by malware to assist in ensuring that the malware is started upon a reboot of a programmable device. After enumerating startup hooks in the system, startup hooks associated with untrusted executables are deleted. If the startup hook is restored, that is an indication that the untrusted executable may be malware. An indication may then be passed to an anti-malware software to analyze the executable further.

22 Claims, 4 Drawing Sheets

PERSISTENCE PROBING TO DETECT MALWARE

TECHNICAL FIELD

Embodiments described herein generally relate to the detection of malware and in particular to techniques for using persistence probing to detect malware.

BACKGROUND ART

Proactive detection of malicious software, is a constant battle between anti-malware improvements and malware improvements, with each reacting to changes in the tactics and capabilities of the other, with attackers constantly evolving and evading existing defenses. Many approaches have been attempted in response to the problem of malware, each of which have positive and negative aspects. Some of the approaches previously tried include file inspection, file reputation checking, behavioral monitoring, whitelisting, host-based intrusion prevention systems, network-based intrusion prevention systems, access protection, application control, sandboxing, etc. But malware continues to find ways to evade all of those techniques. Improved techniques for detecting malware would be desirable.

DESCRIPTION OF EMBODIMENTS

Figure 1:
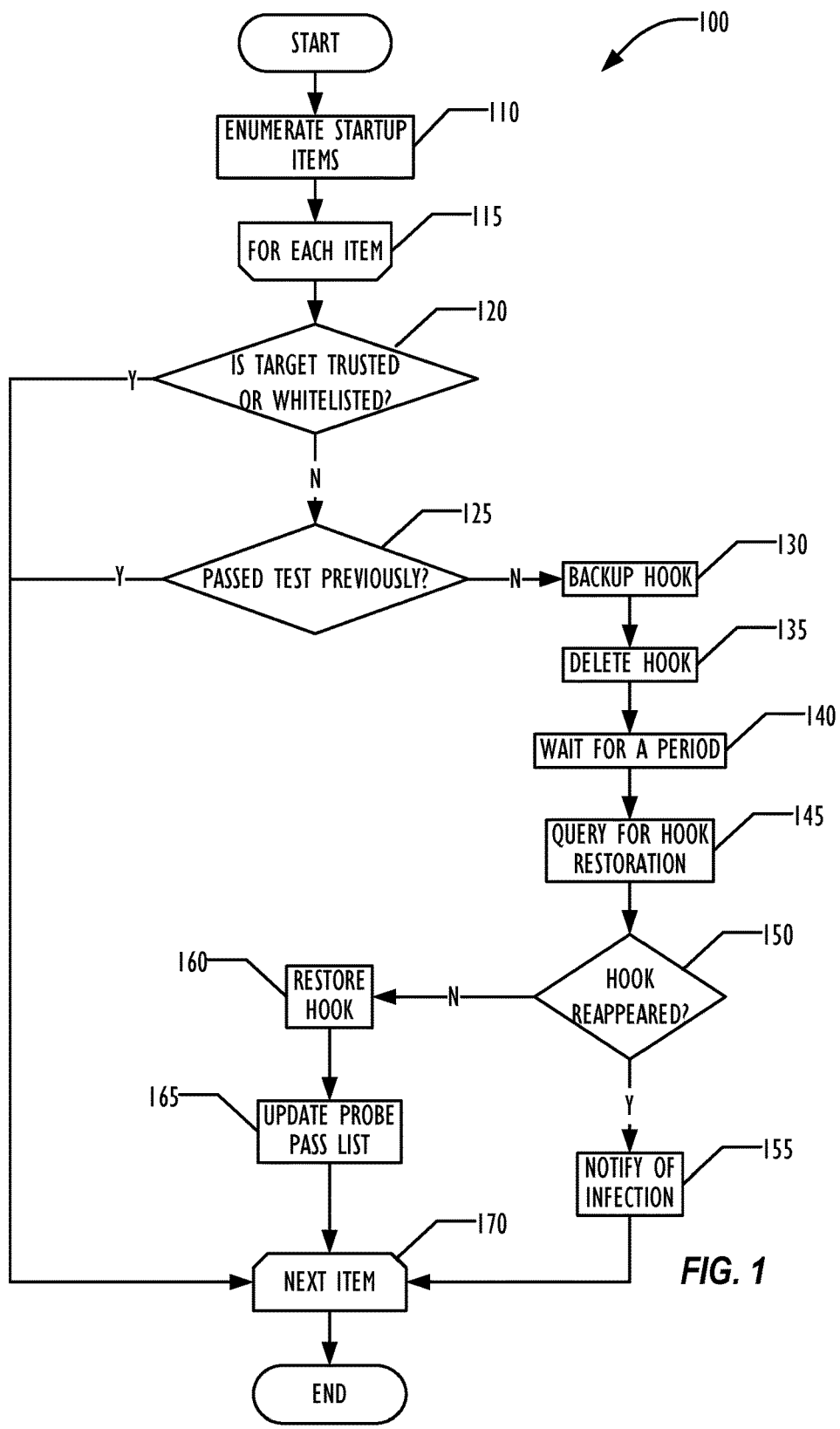
FIG. 1 is a flowchart illustrating a technique for detecting malware through persistence of startup hooks according to one embodiment.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "a computer system" can refer to a single computer or a plurality of computers working together to perform the function described as being performed on or by a computer system.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one."

The term "or" means any of the alternatives and any combination of the alternatives, including all of the alternatives, unless the alternatives are explicitly indicated as mutually exclusive.

The phrase "at least one of" when combined with a list of items, means a single item from the list or any combination of items in the list. The phrase does not require all of the listed items unless explicitly so defined.

As used herein, the term "a computer system" can refer to a single computer or a plurality of computers working together to perform the function described as being performed on or by a computer system. As used herein, the term "a programmable device" can refer to a single programmable device or a plurality of programmable device working together to perform the function described as being performed on or by a programmable device. Programmable devices include any device that includes one or more programmable processing elements, including desktop computers, laptop computers, smart phones, tablets, network devices, Internet of Things devices, etc.

As used herein, the term "processing element" can refer to a single hardware processing element or a plurality of hardware processing elements that together may be programmed to perform the indicated actions. The hardware processing elements may be implemented as virtual hardware processing elements of a virtual programmable device hosted on a physical hardware device. Instructions that when executed program the processing element to perform an action may program any or all of the processing elements to perform the indicated action. Where the processing element is one or more multi-core processors, instructions that when executed program the processing element to perform an action may program any or all of the multiple cores to perform the indicated action.

As used herein, the term "malware" can refer to any software used to disrupt operation of a programmable device, gather sensitive information, or gain access to private systems or networks. Malware includes computer viruses (including worms, Trojan horses, etc.), Bots, ransomware, spyware, adware, scareware, and any other type of malicious program.

As used herein, the term "medium" can refer to a single physical medium or a plurality of media that together store the information described as being stored on the medium.

As used herein, the term "memory" can refer to a single memory device or a plurality of memory devices that together store the information described as being stored on the medium. The memory may be any type of storage device, including random access memory, read-only memory, optical and electromechanical disk drives, etc.

As used herein, the term "startup item" or "startup hook" are used interchangeably to refer to any object or technique that configures an operating system of a programmable device to start an application upon a reboot of the operating system.

Embodiments may be implemented in one or a combination of hardware, firmware, and software. Embodiments may also be implemented as instructions stored on a computer-readable storage medium, which may be read and executed by at least one processing element to perform the operations described herein. A computer-readable storage medium may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

Embodiments, as described herein, may include, or may operate on, logic or a number of components, modules, or mechanisms. Modules may be hardware, software, or firmware communicatively coupled to one or more processing elements in order to carry out the operations described herein. Modules may be hardware modules, and as such, modules may be considered tangible entities capable of performing specified operations and may be configured or arranged in a certain manner. Circuits may be arranged (e.g., internally or with respect to external entities such as other circuits) in a specified manner as a module. The whole or part of one or more programmable devices (e.g., a standalone client or server computer system) or one or more hardware processing elements may be configured by firmware or software (e.g., instructions, an application portion, or an application) as a module that operates to perform specified operations. The software may reside on a machine readable medium. The software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Where modules are temporarily configured, each of the modules need not be instantiated at any one moment in time. For example, where the modules comprise a general-purpose hardware processing element configured using software; the general-purpose hardware processing element may be configured as respective different modules at different times. Software may accordingly program a hardware processor, for example, to constitute a particular module at one instance of time and to constitute a different module at a different instance of time. Modules may also be software or firmware modules, which operate to perform the methodologies described herein.

Embodiments disclosed below take advantage of a fundamental requirement of most malware, which is to persist across reboots of the programmable device in order to maximize the effectiveness of their payloads. This is typically achieved through the creation of operating system dependent objects that are used to maintain system environmental and configuration information. For example, in a machine running the Microsoft Windows® operating system, these objects may include Windows registry keys and values, such as run keys, object handlers, AppinitDLLs, image file execution options, userinit, and other registry keys and values. These objects may also include service creation objects, scheduled tasks, and startup folder items. Other operating systems may use different types of objects and other techniques for creating cross-reboot persistence may be used. These objects are generally referred to herein as startup hooks or just hooks, without regard to the nature of the specific hook.

These startup hooks may be created so that even if some of the startup hooks are removed, if some portion of the startup hooks remain, or if the malware is started in some other manner, the startup hooks can be restored, allowing the malware to restart itself. Restoration of the startup hooks may occur during the initial processing of the malware, at shutdown or restart of the programmable device, or at any time during the execution of the malware.

These hooks allow the malware, once installed, to ensure that the malware is executed after (or during) a reboot of the programmable device, typically without requiring user input to initiate execution. In some cases, malware may be configured not to restart every reboot, but to restart after a predetermined or random number of reboots. In some cases, malware may be configured to delay a restart of the malware or use other techniques to obfuscate the presence of the malware in the programmable device. This is a strength of the malware, because the persistence of the hooks may make the malware difficult to completely eradicate from the programmable device, since any portion that is able to execute may be able to cause execution of the whole malware.

But that strength may be turned into a weakness by embodiments described below, in which startup hooks are identified and removed, then observations are made to determine whether the startup hooks are restored. Reestablishment of startup hooks in legitimate, non-malware software is believed to be extremely rare, and is believed to be almost always an indication of an infection by malware. If the startup hooks are restored, therefore, embodiments may consider the associated application or service to be malware; if the startup hooks are not restored, embodiments may determine that the associated application or service appears not to be malware. In that situations, startup hooks may be safely established, to allow the legitimate non-malware software to execute correctly. Additional optimizations can be made to reduce the potential impact to the operating system and trusted applications. The overhead resulting from the embodiments described below is very low, because the probing disclosed below can be limited to new startup items, which only arise infrequently in the average programmable device. These techniques can be used in addition to other conventional techniques for detecting malware, providing another weapon in the arsenal of the anti-malware software provider.

FIG. 1 is a flowchart illustrating a technique 100 for monitoring the persistence of startup items according to one embodiment.

In block 110, the startup items present in the programmable device can be searched for and enumerated. The way in which the startup items are searched for and enumerated is not significant, and any desired technique or techniques for enumerating startup items may be used. The information collected about each startup item includes a target for the startup item, indicating an executable to be executed when the startup items processed. Startup items that do not point to an executable may be ignored during this enumeration procedure. The enumeration procedure of block 110 may collect also any additional information that may be considered useful for evaluating the startup item in addition to information extracted from the startup item itself.

Then in blocks 115 through 170, each enumerated startup item can be examined and evaluated. In block 120, the target of the startup item may be examined to determine whether the target is trusted or whitelisted. In determining whether the target is trusted, any desired technique may be used, such as use of a reputation service of any type known in the art. This may involve communicating with a reputation service that is remote from the programmable device. Similarly, any known technique for using whitelists may be used to compare the target against one or more whitelists, which may be local whitelists or remote whitelists. In addition to whitelists, blacklists may be used to determine that the target is not a trusted executable.

If the evaluation of the startup item target in block 120 determines that the target is a trusted executable, whether by reputation or by comparing the target to a whitelist or blacklist, the startup item may be ignored and the next startup item considered.

If the target is evaluated as non-trusted, whether by reputation, by not finding the target on a whitelist, by finding the target on a blacklist, or any combination of those techniques, then in one embodiment in block 125 the startup item is checked for having been processed previously. If the startup item was previously processed and remains in the system, the startup item may be deemed safe and ignored. This check for previous evaluations is an optimization over checking the startup items every time, but some embodiments may omit the check for previous evaluations. In some embodiments, the decision on handling of startup items that have been previous evaluated may be reputation guided. E.g., a startup item with a certain reputation level may only be evaluated once, while startup items with a different reputation level may be evaluated multiple times, to allow additional reputational updates.

If the startup item was not previously evaluated, then a procedure of removing the startup item begins. In block 130, the startup item may be backed up to any desired storage, including volatile storage devices such as memory and non-volatile storage devices such as hard drives. This allows restoring the startup item to its original state if it is later determined to be safe.

In block 135, the backed up startup item may be removed, using any technique appropriate for removing the startup item. For example, a key-value pair may be removed from the Windows registry or a file may be deleted from a startup folder of a file system.

Most non-malware applications make no effort to ensure that their startup hooks are maintained in the operating system, and will simply break or fail to start if the startup hook is removed as in block 135. Generally, only malware makes an effort to ensure that the startup hooks established at installation or an initial execution are maintained. One known type of non-malware application that attempts to maintain its startup hooks is anti-malware software, because of a known effort by some kinds of malware to try to disable the anti-malware software. However, such anti-malware software are generally be recognized as trusted in block 120, and are not a concern.

After removing the startup item, in block 140 waits for a while before checking to see if the startup item has been restored. In many examples of malware, the malware code may replace a removed startup hook within seconds. However, embodiments may allow user or administrator configuration of the time period for checking for a restored startup item. That time period may be second, minutes, or any desired longer period, although typically a time period may be configured at a period of less than a day. Although described above as waiting, embodiments of the anti-malware detection technique may be implemented to check other startup items while waiting for the time to check for restoration of a removed startup item.

In some embodiments, startup items may be associated with an application, and instead of removing startup items one by one, all or some other number of the startup items associated with the application may be backed up and removed in blocks 130 and 135 as a batch.

After waiting for a suitable period, in block 145 a check may be made to determine whether the startup item has been restored, generally using the same techniques for collecting information about the startup items in block 110.

In block 150, if the startup item that was removed has been restored, embodiments may consider the restoration to be an indication of an infection by malware and an indication that malware has been detected may be generated in block 155. In some embodiments, this indication may be sent to another anti-malware system to notify the other anti-malware system of the infection suggested by the restoration of the startup item. In other embodiments, the indication may be a flag or other indication that is read by other anti-malware software on the programmable device. The other anti-malware software may then perform any desired anti-malware activity, including scanning the application or executable associated with the restored startup item, attempting to remove the malware, etc. In some embodiments, instead of notifying another anti-malware software or system of the infection, the anti-malware software performing the startup item checking may perform other anti-malware remedial actions in response to the recognition that the startup item has been restored, including re-removal of the startup item, and possibly other cleaning and removal actions.

In some embodiments, the reputation check made in block 120 may produce a result that exists along a trustworthiness continuum, rather than a simple black or white trustworthiness result. The level of trustworthiness along that continuum may impact the waiting period of block 140. For example, at some point along the continuum, the waiting period may be only a few seconds or minutes, while at another point along the continuum, the waiting period may be longer, lasting until the associated application is terminated, such as by a shutdown of the programmable device.

If the startup item has not reappeared with the check is made in block 150, that is an indication that the startup item is not associated with malware. In that situation, to avoid damaging the non-malware software associated with the startup item, in block 160 the startup item that was removed may be restored from the backup made in block 130. Then in block 165, embodiments may update a list or other record of start items that have been evaluated without finding malware. The next time that startup item is detected, embodiments may avoid the backup, remove, and check for restore procedure of block 130-150, because that startup item is now considered to be associated with a non-malware application. Although designated a list, a record may be kept of successfully evaluated startup items using any desired technique for preserving information for the next time this startup item is encountered.

Finally in block 170, if any additional startup items need to be checked, the procedure starts over with the next item in block 115.

In some embodiments, the technique 100 may be performed during the reboot procedure for the operating systems. Alternately, or in addition to being performed during reboot, the technique 100 may be performed during a shutdown or restart procedure for the programmable device. The technique 100 may be implemented as part of any number of other anti-malware activities performed during a reboot or shutdown procedure.

In one embodiment, after removing the startup item from the registry or wherever it resides, the anti-malware software may start the target of the startup item. For example, in a situation where the analysis of the application is inconclusive, the anti-malware software may replace the startup item with information to tell the anti-malware software to execute something at startup time that will execute the not-quite-trusted target of the original startup item in a way that allows the anti-malware software to monitor execution of the target. If the monitoring anti-malware software detects replacement of the startup item by the target, that then indicates that the target is likely to be malware and the notification or indication of block 155 may be made. This provides a more event-driven approach than use of a predetermined waiting period. Similarly, if while monitoring the target executable the startup hooks are not restored, then that is an indication that the target or its associated application may be non-malware.

In some embodiments, if a notification or indication of an infection is made in block 155, information about the target and the application with which that target is associated may be provided with negative reputation information to whatever reputation system is in use. Alternately, where white or blacklists are in use, the target or application may be added to the blacklist or removed from the whitelist. Similarly, if the startup hooks are not restored, the reputation of that target may be updated positively.

In some embodiments, the nature of the startup item may affect how it is processed by this technique. For example, some applications define that certain file types are to be processed by that application by default and allow a user to specify that the application should maintain those file type associations. That may result in the creation of startup hooks by a non-malware application that get restored. In one embodiment, a type of startup hook that is restored that is a "safe" type of startup hook restoration may not affect the reputation of the startup hook in the same way that another type of startup hook that is considered less safe may.

Figure 2:
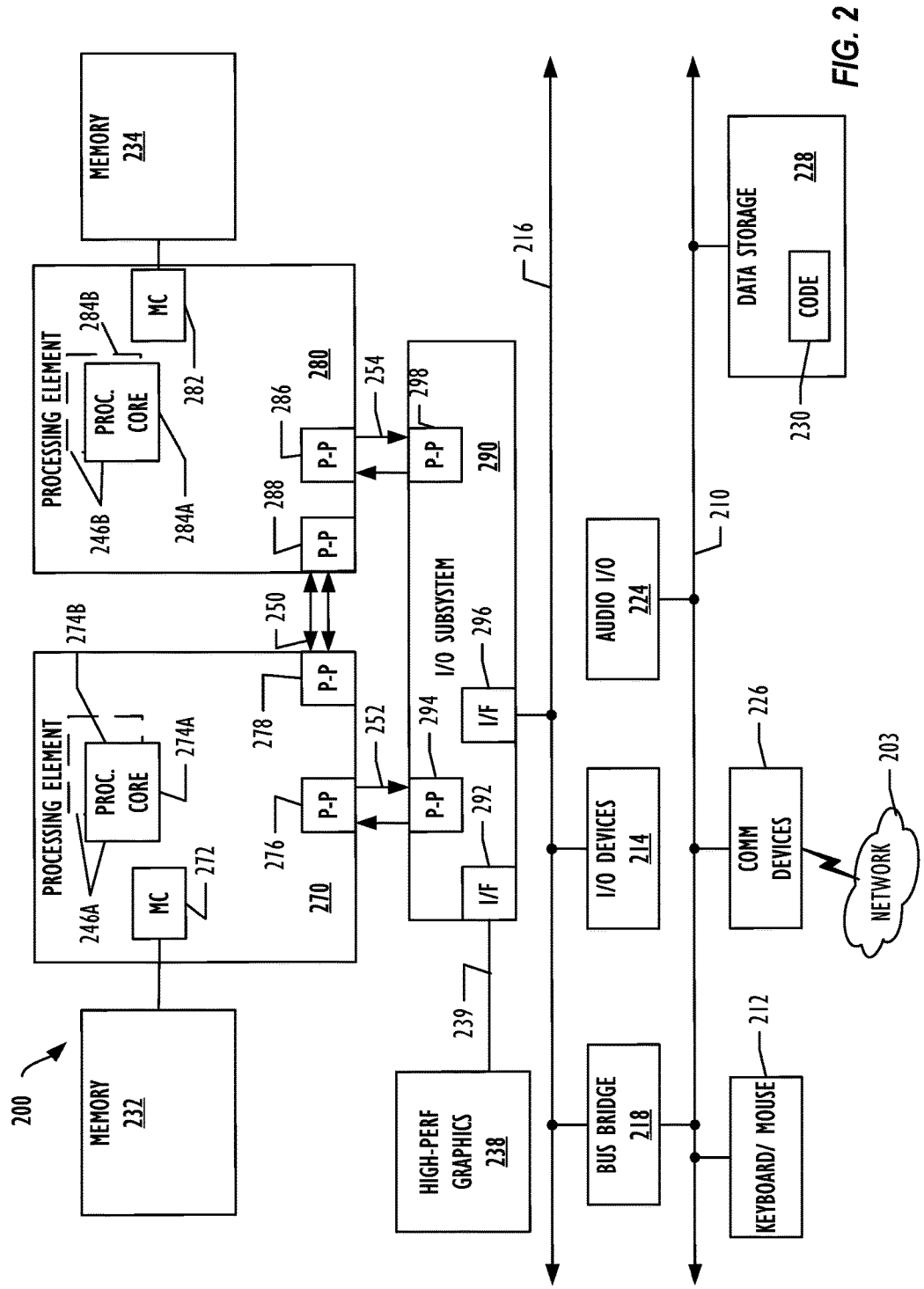
FIGS. 2-3 are block diagrams illustrating a programmable device for use with techniques described herein according to one embodiment.

Referring now to FIG. 2, a block diagram illustrates a programmable device 200 that may be used for implementing the techniques described herein in accordance with one embodiment. The programmable device 200 illustrated in FIG. 2 is a multiprocessor programmable device that includes a first processing element 270 and a second processing element 280. While two processing elements 270 and 280 are shown, an embodiment of programmable device 200 may also include only one such processing element.

Programmable device 200 is illustrated as a point-to-point interconnect system, in which the first processing element 270 and second processing element 280 are coupled via a point-to-point interconnect 250. Any or all of the interconnects illustrated in FIG. 2 may be implemented as a multi-drop bus rather than point-to-point interconnects.

As illustrated in FIG. 2, each of processing elements 270 and 280 may be multicore processors, including first and second processor cores (i.e., processor cores 274a and 274b and processor cores 284a and 284b). Such cores 274a, 274b, 284a, 284b may be configured to execute instruction code. However, other embodiments may use processing elements that are single core processors as desired. In embodiments with multiple processing elements 270, 280, each processing element may be implemented with different numbers of cores as desired.

Each processing element 270, 280 may include at least one shared cache 246. The shared cache 246a, 246b may store data (e.g., instructions) that are utilized by one or more components of the processing element, such as the cores 274a, 274b and 284a, 284b, respectively. For example, the shared cache may locally cache data stored in a memory 232, 234 for faster access by components of the processing elements 270, 280. In one or more embodiments, the shared cache 246a, 246b may include one or more mid-level caches, such as level 2 (L2), level 3 (L3), level 4 (L4), or other levels of cache, a last level cache (LLC), or combinations thereof.

While FIG. 2 illustrates a programmable device with two processing elements 270, 280 for clarity of the drawing, the scope of the present invention is not so limited and any number of processing elements may be present. Alternatively, one or more of processing elements 270, 280 may be an element other than a processor, such as an graphics processing unit (GPU), a digital signal processing (DSP) unit, a field programmable gate array, or any other programmable processing element. Processing element 280 may be heterogeneous or asymmetric to processing element 270. There may be a variety of differences between processing elements 270, 280 in terms of a spectrum of metrics of merit including architectural, microarchitectural, thermal, power consumption characteristics, and the like. These differences may effectively manifest themselves as asymmetry and heterogeneity amongst processing elements 270, 280. In some embodiments, the various processing elements 270, 280 may reside in the same die package.

First processing element 270 may further include memory controller logic (MC) 272 and point-to-point (P-P) interconnects 276 and 278. Similarly, second processing element 280 may include a MC 282 and P-P interconnects 286 and 288. As illustrated in FIG. 2, MCs 272 and 282 couple processing elements 270, 280 to respective memories, namely a memory 232 and a memory 234, which may be portions of main memory locally attached to the respective processors. While MC logic 272 and 282 is illustrated as integrated into processing elements 270, 280, in some embodiments the memory controller logic may be discrete logic outside processing elements 270, 280 rather than integrated therein.

Processing element 270 and processing element 280 may be coupled to an I/O subsystem 290 via respective P-P interconnects 276 and 286 through links 252 and 254. As illustrated in FIG. 2, I/O subsystem 290 includes P-P interconnects 294 and 298. Furthermore, I/O subsystem 290 includes an interface 292 to couple I/O subsystem 290 with a high performance graphics engine 238. In one embodiment, a bus (not shown) may be used to couple graphics engine 238 to I/O subsystem 290. Alternately, a point-to-point interconnect 239 may couple these components.

In turn, I/O subsystem 290 may be coupled to a first link 216 via an interface 296. In one embodiment, first link 216 may be a Peripheral Component Interconnect (PCI) bus, or a bus such as a PCI Express bus or another I/O interconnect bus, although the scope of the present invention is not so limited.

As illustrated in FIG. 2, various I/O devices 214, 224 may be coupled to first link 216, along with a bridge 218 that may couple first link 216 to a second link 210. In one embodiment, second link 210 may be a low pin count (LPC) bus. Various devices may be coupled to second link 210 including, for example, a keyboard/mouse 212, communication device(s) 226 (which may in turn be in communication with the computer network 203), and a data storage unit 228 such as a disk drive or other mass storage device which may include code 230, in one embodiment. The code 230 may include instructions for performing embodiments of one or more of the techniques described above. Further, an audio I/O 224 may be coupled to second link 220.

Note that other embodiments are contemplated. For example, instead of the point-to-point architecture of FIG. 2, a system may implement a multi-drop bus or another such communication topology. Although links 216 and 210 are illustrated as busses in FIG. 2, any desired type of link may be used. In addition, the elements of FIG. 2 may alternatively be partitioned using more or fewer integrated chips than illustrated in FIG. 2.

Figure 3:
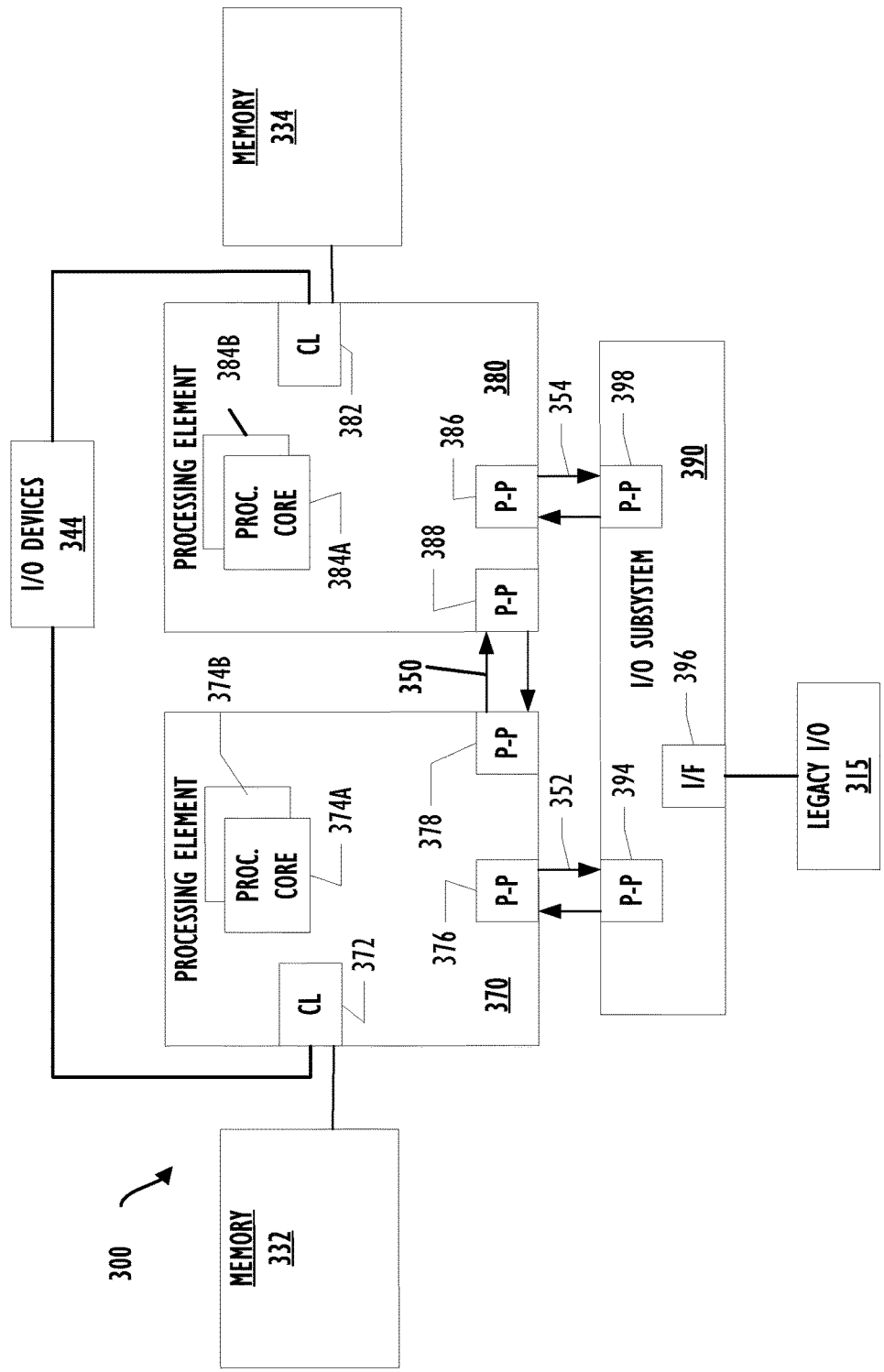

Referring now to FIG. 3, a block diagram illustrates a programmable device 300 according to another embodiment. Certain aspects of FIG. 3 have been omitted from FIG. 3 in order to avoid obscuring other aspects of FIG. 3.

FIG. 3 illustrates that processing elements 370, 380 may include integrated memory and I/O control logic ("CL") 372 and 382, respectively. In some embodiments, the 372, 382 may include memory control logic (MC) such as that described above in connection with FIG. 2. In addition, CL 372, 382 may also include I/O control logic. FIG. 3 illustrates that not only may the memories 332, 334 be coupled to the CL 372, 382, but also that I/O devices 344 may also be coupled to the control logic 372, 382. Legacy I/O devices 315 may be coupled to the I/O subsystem 390 by interface 396. Each processing element 370, 380 may include multiple processor cores, illustrated in FIG. 3 as processor cores 374A, 374B, 384A and 384B. As illustrated in FIG. 3, I/O subsystem 390 includes point-to-point (P-P) interconnects 394 and 398 that connect to P-P interconnects 376 and 386 of the processing elements 370 and 380 with links 352 and 354. Processing elements 370 and 380 may also be interconnected by link 350 and interconnects 378 and 388, respectively.

The programmable devices depicted in FIGS. 2 and 3 are schematic illustrations of embodiments of programmable devices that may be utilized to implement various embodiments discussed herein. Various components of the programmable devices depicted in FIGS. 2 and 3 may be combined in a system-on-a-chip (SoC) architecture.

Figure 4:
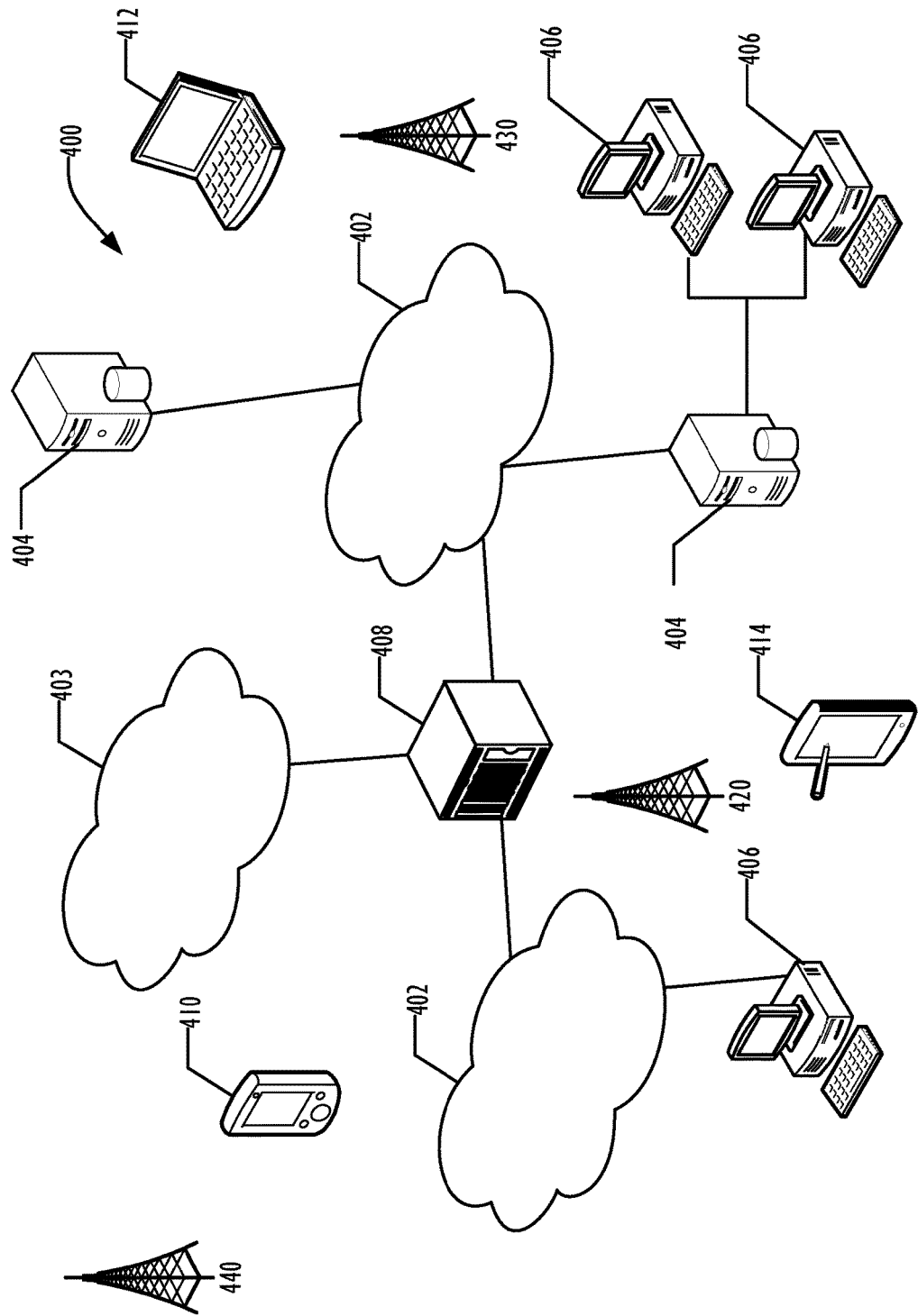
FIG. 4 is a block diagram illustrating a network of programmable devices according to one embodiment.

Referring now to FIG. 4, an example infrastructure 400 in which the techniques described above may be implemented is illustrated schematically. Infrastructure 400 contains computer networks 402. Computer networks 402 may include many different types of computer networks available today, such as the Internet, a corporate network or a Local Area Network (LAN). Each of these networks can contain wired or wireless programmable devices and operate using any number of network protocols (e.g., TCP/IP). Networks 402 may be connected to gateways and routers (represented by 408), end user computers 406, and computer servers 404. For example, in some embodiments the persistence analysis described above is largely performed on the end user computers 406 or mobile devices 410, 412, and 414, while computer servers 404 provide reputation services via the networks 402 or cellular networks 403. Other embodiments may provide at least some reputation services on the local end user computers 406 or mobile devices 410, 412, and 414. Infrastructure 400 also includes cellular network 403 for use with mobile communication devices. Mobile cellular networks support mobile phones and many other types of mobile devices. Mobile devices in the infrastructure 400 are illustrated as mobile phones 410, laptops 412 and tablets 414. A mobile device such as mobile phone 410 may interact with one or more mobile provider networks as the mobile device moves, typically interacting with a plurality of mobile network towers 420, 430, and 440 for connecting to the cellular network 403. Although referred to as a cellular network in FIG. 4, a mobile device may interact with towers of more than one provider network, as well as with multiple non-cellular devices such as wireless access points and routers 408. In addition, the mobile devices 410, 412 and 414 may interact with non-mobile devices such as computers 404 and 406 for desired services.

The following examples pertain to further embodiments.

Example 1 is a machine readable medium, on which are stored instructions for detecting malware through detection of persistent startup hooks, comprising instructions that when executed cause a machine to: identify a startup hook associated with a target executable; remove the startup hook; determine whether the startup hook is restored within a period after the removal; and update a reputation of the target executable negatively responsive to a determination that the startup hook is restored.

In Example 2 the subject matter of Example 1 optionally includes wherein the instructions that when executed cause the machine to identify the startup hook comprise instructions that when executed cause the machine to: enumerate a plurality of startup hooks at startup of an operating system of the machine.

In Example 3 the subject matter of any of Examples 1-2 optionally includes wherein the instructions that when executed cause the machine to identify the startup hook comprise instructions that when executed cause the machine to: evaluate the reputation of the startup hook or target executable; and ignore the startup hook responsive to the reputation.

In Example 4 the subject matter of any of Examples 1-2 optionally includes wherein the instructions that when executed cause the machine to identify the startup hook comprise instructions that when executed cause the machine to: determine whether the startup hook has been evaluated previously; and ignore the startup hook responsive to the determination.

In Example 5 the subject matter of any of Examples 1-2 optionally includes wherein the instructions further comprise instructions that when executed cause the machine to: backup the startup hook prior to removal of the startup hook; and restore the startup hook responsive to a determination that the startup hook has not been restored.

In Example 6 the subject matter of Example 5 optionally includes wherein the instructions further comprise instructions that when executed cause the machine to: update the reputation of the target executable positively.

In Example 7 the subject matter of any of Examples 1-2 optionally includes wherein the identification of the startup hook, removal of the startup hook, determination whether the startup hook is restored, and update of the reputation of the target executable are performed upon a reboot of the machine.

Example 8 is a method of detecting malware in a programmable device, comprising: identifying, by the programmable device, a startup hook associated with a target executable; removing, by the programmable device, the startup hook; and updating, by the programmable device, a reputation of the target executable negatively responsive to a determination that the startup hook is restored within a period after the removal.

In Example 9 the subject matter of Example 8 optionally includes wherein identifying the startup hook comprises: enumerating a plurality of startup hooks.

In Example 10 the subject matter of any of Examples 8-9 optionally includes further comprising: evaluating a reputation of the startup hook or target executable; and ignoring the startup hook responsive to the reputation.

In Example 11 the subject matter of any of Examples 8-9 optionally includes further comprising: determining whether the startup hook has previously been evaluated; and ignoring the startup hook responsive to the determination.

In Example 12 the subject matter of any of Examples 8-9 optionally includes further comprising: backing up the startup hook prior to removal of the startup hook; and restoring the startup hook responsive to a determination that the startup hook has not been restored.

In Example 13 the subject matter of Example 12 optionally includes further comprising: updating the reputation of the target executable positively.

In Example 14 the subject matter of any of Examples 8-9 optionally includes wherein the identifying, removing, and updating are performed upon a reboot of the programmable device.

Example 15 is a programmable device configured to detect malware, comprising: a processing element; a memory, coupled to the processing element, on which are stored instructions for using startup hooks to identify malware, comprising instructions that when executed cause the processing element to: identify a startup hook associated with a target executable; remove the startup hook; determine whether the startup hook is restored within a period after the removal; and update a reputation of the target executable negatively responsive to a determination that the startup hook is restored.

In Example 16 the subject matter of Example 15 optionally includes wherein the instructions that when executed cause the processing element to identify startup hook comprise instructions that when executed cause the processing element to: enumerate a plurality of startup hooks at startup of an operating system of the processing element.

In Example 17 the subject matter of any of Examples 15-16 optionally includes wherein the instructions that when executed cause the processing element to identify startup hook comprise instructions that when executed cause the processing element to: evaluate the reputation of the startup hook or target executable; and ignore the startup hook responsive to the reputation.

In Example 18 the subject matter of any of Examples 15-16 optionally includes wherein the instructions that when executed cause the processing element to identify startup hook comprise instructions that when executed cause the processing element to: determine whether the startup hook has been evaluated previously; and ignore the startup hook responsive to the determination.

In Example 19 the subject matter of any of Examples 15-16 optionally includes wherein the instructions further comprise instructions that when executed cause the processing element to: backup the startup hook prior to removal of the startup hook; and restore the startup hook responsive to a determination that the startup hook has not been restored.

In Example 20 the subject matter of Example 19 optionally includes wherein the instructions further comprise instructions that when executed cause the processing element to: update the reputation of the target executable positively.

In Example 21 the subject matter of any of Examples 15-16 optionally includes wherein the identification of the startup hook, removal of the startup hook, determination whether the startup hook is restored, and update of the reputation of the target executable are performed upon a reboot of the processing element.

Example 22 is a programmable device adapted for detecting malware through detection of persistent startup hooks, comprising: means for identifying a startup hook associated with a target executable; means for removing the startup hook; means for determining whether the startup hook is restored within a period after the removal; and means for updating a reputation of the target executable negatively responsive to a determination that the startup hook is restored.

In Example 23 the subject matter of Example 22 optionally includes wherein the means for identifying the startup hook comprise: means for enumerating a plurality of startup hooks at startup of an operating system of the machine.

In Example 24 the subject matter of any of Examples 22-23 optionally includes wherein the means for identifying the startup hook comprise: means for evaluating the reputation of the startup hook or target executable; and means for ignoring the startup hook responsive to the reputation.

In Example 25 the subject matter of any of Examples 22-23 optionally includes wherein the means for identifying the startup hook comprise: means for determining whether the startup hook has been evaluated previously; and means for ignoring the startup hook responsive to the determination.

In Example 26 the subject matter of any of Examples 22-23 optionally includes further comprising: means for backing up the startup hook prior to removal of the startup hook; and means for restoring the startup hook responsive to a determination that the startup hook has not been restored.

In Example 27 the subject matter of Example 26 optionally includes wherein further comprising: means for updating the reputation of the target executable positively.

In Example 28 the subject matter of any of Examples 22-23 optionally includes wherein the identification of the startup hook, removal of the startup hook, determination whether the startup hook is restored, and update of the reputation of the target executable are performed upon a reboot of the machine.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A storage device or storage disk comprising instructions that, when executed, cause a machine to at least:
   identify a startup hook associated with a target executable based on a reputation of the target executable;
   remove the startup hook;
   determine whether the startup hook is restored within a period after the removal, a length of the period associated with the reputation of the target executable; and
   when the startup hook is determined to be restored within the period, update the reputation of the target executable to a negative reputation.

2. The machine readable medium of claim 1, wherein the instructions, when executed, identify the startup hook by:
   enumerating a plurality of startup hooks at startup of an operating system of the machine.

3. The machine readable medium of claim 1, wherein the instructions, when executed, identify the startup hook by:
   evaluating the reputation of the startup hook or target executable; and
   ignoring the startup hook in response to the reputation.

4. The machine readable medium of claim 1, wherein the instructions, when executed, identify the startup hook by:
   determining whether the startup hook has been evaluated previously; and
   ignoring the startup hook in response to the determination.

5. The machine readable medium of claim 1, wherein the instructions cause the machine to:
   backup the startup hook prior to removal of the startup hook; and
   restore the startup hook in response to a determination that the startup hook has not been restored within the period.

6. The machine readable medium of claim 5, wherein the instructions cause the machine to:
when the startup hook is determined to not be restored, update the reputation of the target executable to a positive reputation.

7. The machine readable medium of claim 1, wherein the instructions are to execute upon a reboot of the machine.

8. A method of detecting malware in a programmable device, the method comprising:
identifying, by the programmable device, a startup hook associated with a target executable based on a reputation of the target executable;
removing, by the programmable device, the startup hook; and
updating, by the programmable device, a reputation of the target executable to a negative reputation in response to a determination that the startup hook is restored within a period after the removal, a length of the period associated with the reputation of the target executable.

9. The method of claim 8, wherein the identifying of the startup hook includes:
enumerating a plurality of startup hooks.

10. The method of claim 8, wherein the identifying of the startup hook further includes:
evaluating a reputation of the startup hook or target executable; and
ignoring the startup hook based on to the evaluation of the reputation.

11. The method of claim 8, wherein the identifying of the startup hook further includes:
determining whether the startup hook has previously been evaluated; and
ignoring the startup hook when the startup hook has previously been evaluated.

12. The method of claim 8, further including:
backing up the startup hook prior to removal of the startup hook; and
restoring the startup hook in response to a determination that the startup hook has not been restored.

13. The method of claim 12, further including:
updating the reputation of the target executable to a positive reputation.

14. The method of claim 8, further including rebooting the programmable device.

15. A programmable device to detect malware, the device comprising:
a processor;
a memory, in communication with the processor, the memory including instructions that, when executed, cause the processor to at least:
identify, based on a reputation of a target executable, a startup hook associated with the target executable;
remove the startup hook;
determine whether the startup hook is restored within a period after the removal, a length of the period associated with the reputation of the target executable; and
when the startup hook is restored within the period, update the reputation of the target executable to a negative reputation.

16. The programmable device of claim 15, wherein the processor is to identify the startup hook by:
enumerating a plurality of startup hooks at startup of an operating system of the processor.

17. The programmable device of claim 15, wherein the processor is to identify the startup hook by:
evaluating the reputation of the startup hook or target executable; and
ignoring the startup hook in response to the reputation.

18. The programmable device of claim 15, wherein the processor is to:
determine whether the startup hook has been evaluated previously; and
ignore the startup hook when the startup hook has been previously evaluated.

19. The programmable device of claim 15, wherein the processor is to:
backup the startup hook prior to removal of the startup hook; and
restore the startup hook in response to the determination that the startup hook has not been restored.

20. The programmable device of claim 19, wherein the processor is to:
update the reputation of the target executable to a positive reputation.

21. The programmable device of claim 15, wherein the instructions are to execute upon a reboot of the processor.

22. The programmable device of claim 15, wherein the processor is to:
replace the startup hook associated with the target executable with a replacement startup item;
execute, using the replacement startup item, the target executable; and
monitor the execution of the target executable to update the reputation of the target executable.

* * * * *

UNITED STATES PATENT AND TRADEMARK OFFICE
CERTIFICATE OF CORRECTION

PATENT NO. : 10,303,876 B2
APPLICATION NO. : 15/391387
DATED : May 28, 2019
INVENTOR(S) : Craig Schmugar et al.

It is certified that error appears in the above-identified patent and that said Letters Patent is hereby corrected as shown below:

In the Claims

Column 12, Line 46 Claim 2 delete "The machine readable medium" and insert --The storage device or storage disk--.

Column 12, Line 50 Claim 3 delete "The machine readable medium" and insert --The storage device or storage disk--.

Column 12, Line 55 Claim 4 delete "The machine readable medium" and insert --The storage device or storage disk--.

Column 12, Line 61 Claim 5 delete "The machine readable medium" and insert --The storage device or storage disk--.

Column 13, Line 1 Claim 6 delete "The machine readable medium" and insert --The storage device or storage disk--.

Column 13, Line 6 Claim 7 delete "The machine readable medium" and insert --The storage device or storage disk--.

Signed and Sealed this
Thirteenth Day of August, 2019

Andrei Iancu
*Director of the United States Patent and Trademark Office*